Figure 1:
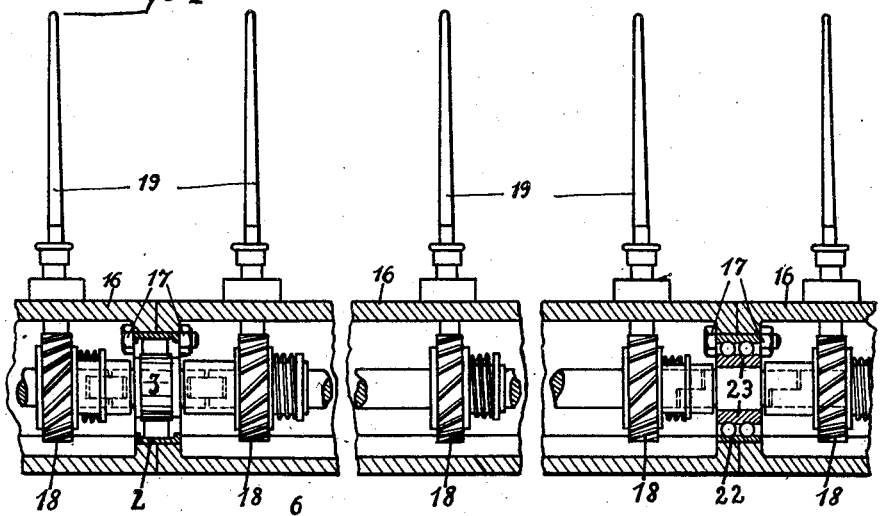

Sept. 18, 1928.

J. J. KEYSER

SPINNING SHAFTING

Filed July 6, 1927

1,684,919

INVENTOR
Johann J. Keyser
by Langner, Parry, Card and Langner
Att'ys.

Patented Sept. 18, 1928.

1,684,919

UNITED STATES PATENT OFFICE.

JOHANN JACOB KEYSER, OF AARAU, SWITZERLAND.

SPINNING SHAFTING.

Application filed July 6, 1927, Serial No. 203,852, and in Germany July 12, 1926.

In my copending application Serial No. 18,332 of August 16th, 1926 I have disclosed a shafting structure for spinning, twisting and the like machinery at which the shaft proper is subdivided into a plurality of shaft sections and the beam or casing is also subdivided into the same plurality of beam sections, one shaft section being contained in one beam section respectively and bearings being arranged at the joint of two adjacent beam sections and provided with means for interconnecting the individual shaft sections to one continuous and axially aligned shafting permitting each shaft section to be dismounted in independence from all of the other shaft sections that is the remainder of the complete shafting. Whereas in that former application the interconnection of the shaft sections was effected by unsymmetrical means I am according to this present invention providing means whereby the interconnection of the shaft sections and the intermediate members carried by the bearings is effected in a more symmetrical way. In other words I avoid according to this present invention an engagement of flat keys or lugs of the one coupling element with corresponding recesses of the other element, such type of connecting means requiring a very minute machining of the individual parts since otherwise disagreeable shaft vibrations might occur if the shaft is rotated with the high speed of about 2000 revolutions per minute.

In order to simplify the connection between the individual shaft section and their intermediate connecting members I provide according to this invention a substantially identical coupling by either providing both halves of the coupling with a slot and placing therein a substantially resilient connecting member or by giving both coupling halves a semicircular contour.

In the drawing illustrating two different embodiments of my invention.

Figure 2:
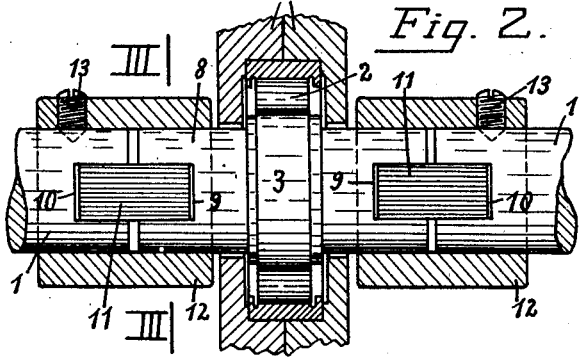
Figure 3:
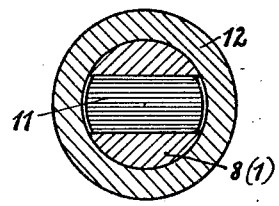
Figure 5:
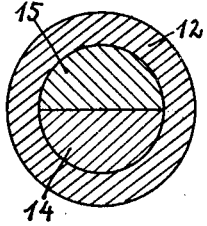
Figure 4:
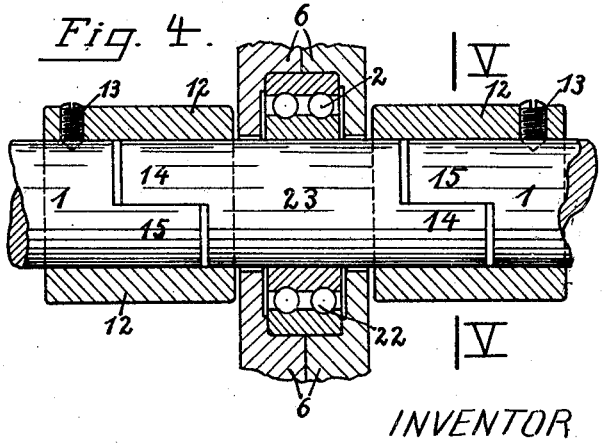

Fig. 1 is a transverse section of the beam of a spinning machine constructed in accordance with this invention, Fig. 2 is a detailed section of a roller bearing and an elastic shaft section coupling, Fig. 3 is a section on line III—III of Fig. 2, Fig. 4 is an enlarged section of an antifriction ball bearing and semicircularly contoured shaft couplings, Fig. 5 is a section on line V—V of Fig. 5.

My invention is of particular utility in connection with spring machines having a worm gear spindle drive. In this instance I am subdividing the beam for the sake of its easier manufacture into a plurality of sections 16 connected with each other to a unitary beam structure by means of screws 17. The operating shaft 1 of the worm gears 18 acting on the spindles 19 is so carried in and by the individual beam sections 16 as to be in a perfect alignment, care being taken that the shaft sections located within the individual beam sections respectively can be easily dismounted and reassembled without impair to the exactness of the drive and of the alignment of the remaining shaft sections. The centering of the individual beam sections 16 with relation to each other and to the spindles 19 is effected by the shaft bearings 2 arranged at the joint of adjacent beam sections as clearly illustrated in the drawing.

According to Fig. 1 the left hand bearing is constructed as a roller bearing whereas the right hand bearing is constituted by a normal ball bearing having two sets of balls. It will readily be seen that both types of bearings are perfectly equivalent as to their operation, the roller bearing being preferred when heavy machinery is under consideration.

According to Fig. 2 the shaft sections 1 are supported by a roller bearing 2 arranged in the end walls 6 of the beam sections 16. The inner portion 3 of the roller bearing is preferably in the form of a stub journal provided on one or both sides with two pins or extensions 8 having slots or recesses 9 at their ends. The studs 8 may be integral with the bearing ring 3 or be mounted nonrotatably therein in any suitable way. The sections of the driving shaft 1 are at their ends also provided with slots or recesses 10 corresponding exactly to the slots or recesses 9 and being symmetrical therewith. A block 11 is inserted into these recesses 9 and 10 and consists preferably of laminated sheet metal in order to impart to the coupling a certain degree of resiliency. A sleeve 12 is slid over the coupling point of the shaft sections 1 and bearing lugs 8 and locked by the screw 13. Instead of the sleeve 12 the coupling may also be surrounded by the cylindrical lugs of the worm gears 18 as illustrated by way of example in Fig. 1.

The embodiment shown in Figs. 2 and 3 and at the left hand side of Fig. 1 is particularly suitable for heavy spindle drives. For lighter machines I am preferring the arrangement illustrated in Figs. 4 and 5. Accordingly to these figures a ball bearing 22 of standard type is provided at its inner ball race ring with a trunnion 23 having semicircular projections 14 on either end or on both ends. The shaft sections are at their ends provided with complementary symmetrical extensions 15 constituting with the ends 14 a complete circular cross section (Fig. 5). The two coupling halves are again held together by sleeves 12 and said screws 13 just as in the embodiment Figs. 2 and 3.

In both embodiments illustrated the trunnions 14 and slots 9 are parallel on both sides of the coordinated bearing. It is obvious however that both could be arranged at an angle of 90° without departure from the spirit of my invention.

I claim:—

1. Sectional shafting construction comprising bearings supported in spaced relation, stub journals mounted in said bearings, shaft sections between said stub journals and in alignment therewith, the opposite ends of said shaft sections and stub journals being formed with interengageable coupling portions, said interengaging portions being all of identical shape to provide for universal interchangeability of said parts, and means for securing said stub journals and shaft sections in coupled relation, said interengaging ends being formed to permit transverse removal of said shaft sections when said securing means have been released.

2. Sectional shafting construction comprising bearings supported in spaced relation, stub journals mounted in said bearings, shaft sections between said stub journals and in alignment therewith, the opposite ends of said shaft sections and stub journals being formed with interengageable coupling portions, having a degree of axial lost motion, to permit self-adjustment of said shaft sections, said interengaging portions being all of identical shape to provide for universal interchangeability of said parts, and means for securing said stub journals and shaft sections in coupled relation, said interengaging ends being formed to permit transverse removal of said shaft sections when said securing means have been released.

3. Sectional shafting construction comprising a casing, bearings supported in spaced relation in said casing, said journals mounted in said bearings, shaft sections between said stub journals and in alignment therewith, and solely supported by said bearings, the opposite ends of said shaft sections and stub journals being formed with interengageable coupling portions, said interengaging portions being all of identical shape to provide their universal interchangeability of said parts, and means for securing said stub journals and shaft sections in coupled relation, said interengaging ends being formed to permit transverse removal of said shaft sections when said securing means have been released.

4. Sectional shafting construction comprising a sectional casing having the sections thereof arranged in end to end abutment, bearings supported in spaced relation in said casing and intersecting the joints between the sections thereof, stub journals mounted in said bearings, the shaft sections between said stub journals and in alignment therewith, the opposite ends of said shaft sections and stub journals being formed with interengageable coupling portions, said interengaging portions being all of identical shape to provide for universal interchangeability of said parts, and means for securing said stub journals and shaft sections in coupled relation, said interengaging ends being formed to permit transverse removal of said shaft sections when said securing means have been released.

In testimony whereof I affix my signature.

JOHANN JACOB KEYSER.